(12) United States Patent
Han

(10) Patent No.: US 7,423,680 B2
(45) Date of Patent: Sep. 9, 2008

(54) APPARATUS AND METHOD FOR CLAMPING RESET VOLTAGE IN IMAGE SENSOR

(75) Inventor: June-Soo Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 11/046,953

(22) Filed: Jan. 31, 2005

(65) Prior Publication Data

US 2005/0168607 A1  Aug. 4, 2005

(30) Foreign Application Priority Data

Feb. 4, 2004  (KR) ............... 10-2004-0007214

(51) Int. Cl.
*H04N 5/335* (2006.01)

(52) U.S. Cl. ............... 348/308; 348/241

(58) Field of Classification Search ............ 348/241, 348/243, 294, 308, 302
See application file for complete search history.

(56) References Cited

U.S. PATENT DOCUMENTS

| | | | |
|---|---|---|---|
| 6,421,085 B1 * | 7/2002 | Xu | ............... 348/308 |
| 6,423,957 B1 * | 7/2002 | Kim et al. | ............... 250/208.1 |
| 7,098,950 B2 * | 8/2006 | Yamamoto et al. | ......... 348/243 |
| 2003/0174226 A1 * | 9/2003 | Ahn et al. | ................ 348/294 |
| 2006/0001750 A1 * | 1/2006 | Mizuguchi et al. | ......... 348/294 |

OTHER PUBLICATIONS

Japanese Patent No. JP6006674 to Teruo et al., having Publication date of Jan. 14, 1994 (w/ English Abstract page).
Japanese Patent No. JP2003018468 to Shinji et al., having Publication date of Jan. 17, 2003 (w/ English Abstract page).
Korean Patent Application No. 1020020013115 to Ahn et al., having Publication date of Sep. 19, 2003 (w/ English Abstract page).

* cited by examiner

*Primary Examiner*—Tuan V Ho
(74) *Attorney, Agent, or Firm*—Monica H. Choi

(57) ABSTRACT

For clamping a reset voltage within an image sensor, an active pixel generates a first reset voltage, and an optical black pixel generates a second reset voltage. In addition, a reset voltage selector selects one of the first and second reset voltages as a selected reset voltage. Such a selected reset voltage is generated separately for each column of the array of pixels in the image sensor for more accurately and flexibly accounting for fabrication variations.

18 Claims, 4 Drawing Sheets

APPARATUS AND METHOD FOR CLAMPING RESET VOLTAGE IN IMAGE SENSOR

BACKGROUND OF THE INVENTION

This application claims priority to Korean Patent Application No. 2004-7214, filed on Feb. 4, 2004, in the Korean Intellectual Property Office, the disclosure of which is incorporated herein in its entirety by reference.

FIELD OF THE INVENTION

The present invention relates generally to image sensors, and more particularly, to clamping of reset voltage in an image sensor, such as a CMOS image sensor that performs correlated double sampling.

DESCRIPTION OF THE RELATED ART

An image sensor is a semiconductor device that converts an optical image into electrical signals. Examples of an image sensor include a charge coupled device (CCD) and a CMOS (complementary metal oxide semiconductor) image sensor. The CCD includes densely arranged MOS capacitors with charge carriers stored in the capacitors and transferred among the capacitors.

A CMOS image sensor includes pixels with each pixel including a photodiode and MOS (metal oxide semiconductor) transistors for selectively accessing the pixel. In addition, the CMOS image sensor includes a control circuit and a signal processing circuit as peripheral circuits.

The CCD has a more complicated fabrication process with a relatively large number of mask steps. In addition, the CCD has more complicated drivers and higher power consumption. Furthermore, the CCD is typically not fabricated as a single chip with a separate chip being fabricated for a signal processor from the chip for the CCD array.

Because of such disadvantages of the CCD, the CMOS image sensor fabricated using sub-micron CMOS technology has been under extensive development. The fabrication process for the CMOS image sensor which typically uses 20 masks is less complicated than the CCD fabrication process which typically uses 30 to 40 masks. In addition, the CMOS image sensor consumes less power. Furthermore, the CMOS image sensor may include several signal processors and is fabricated as a single chip. Thus, the CMOS image sensor is considered as a next generation image sensor.

FIG. 1 is a schematic diagram of a unit pixel 100 of a conventional CMOS image sensor. Referring to FIG. 1, the unit pixel 100 includes a photodiode PD for gathering charge carriers from received light. A transfer transistor 101 transfers the gathered charge carriers from the photodiode PD to a floating diffusion area FD. A reset transistor 102 discharges the charge carriers within the floating area FD by setting an electric potential thereon during reset. A drive transistor 103 acts as a source follower. A select transistor 104 acts as a switch for addressing. A load transistor (not shown) for reading an output voltage Vout of the unit pixel 100 is connected to the unit pixel 100.

The operation of the unit pixel of the CMOS image sensor will now be described. The reset transistor 102 and the transfer transistor 101 are initially turned on to reset the unit pixel 100. During such reset, the photodiode PD is depleted, and the potential at the floating diffusion area FD is set to a supply voltage VDD.

Thereafter, the transfer transistor 101 is turned off, the select transistor 104 is turned on, and the reset transistor 102 is turned off. In addition, a first output voltage (V1) is read from the output node labeled Vout for being stored in a buffer (not shown). Subsequently, the transfer transistor 101 is turned on and charge carriers gathered in the photodiode PD are transferred to the floating diffusion area FD. The amount of such gathered charge carriers depends on the intensity of light at the photodiode PD. Also, a second output voltage (V2) is read from the output node labeled Vout for being stored in a buffer (not shown).

A difference between the first and second output voltages (V2−V1), which is an analog signal, is converted to a digital signal and is output as digital data for the pixel 100. This completes one cycle of operation for the unit pixel 100.

The first output voltage V1 represents noise present in the pixel 100, and the second output voltage V2 represents such noise and the image information of the charge carriers gathered by the photodiode PD. Thus, by subtracting the first output voltage V1 from the second output voltage V2 to generate the image data, noise is eliminated in a process termed correlated double sampling (CDS).

The first output voltage V1 results from the photodiode PD being reset by turning on the transfer transistor 101 and the reset transistor 102. Thus, the first output voltage V1 is also referred to as the "reset voltage" for correlated double sampling. However, such a first output voltage V1 can be outside of a proper range depending on external circumstances. For example, when excessive light is present during resetting of the photodiode, the first output voltage V1 may be too low. In that case, image distortion results even when correlated double sampling is used in the CMOS image sensor.

For preventing the reset voltage V1 from being out of a desirable range, the reset voltage V1 is clamped. FIG. 2 is a schematic diagram of a conventional clamp circuit connected to a CMOS image sensor. Referring to FIG. 2, a clamp circuit 200 generates a clamping voltage Vclamp using a resistive voltage divider comprised of first, second, and third resistors R1, R2, and R3. The Vclamp is fixed for a CMOS image sensor depending on the reset voltage distribution for the CMOS image sensor.

Further referring to FIG. 2, when the reset voltage from a pixel is lower than Vclamp, a diode turns on for transferring Vclamp as the Vout thus limiting the lower range of the reset voltage. Transistors 105 and 106 are load transistors, each coupled to an output node generating Vout.

With the prior art clamping circuit 200, Vclamp is a fixed value for the whole array of pixels in the CMOS image sensor. Thus, the reset voltage may not be accurately controlled since the reset voltage may vary across the different locations of the array of pixels from fabrication variations.

SUMMARY OF THE INVENTION

Accordingly, the present invention has more flexibility for clamping a reset voltage within an image sensor.

In an apparatus and method for clamping a reset voltage within an image sensor, an active pixel generates a first reset voltage, and an optical black pixel generates a second reset voltage. In addition, a reset voltage selector selects one of the first and second reset voltages as a selected reset voltage.

In another embodiment of the present invention, the reset voltage selector includes a comparator for comparing the first reset voltage and the second reset voltage. In addition, a transfer device outputs the selected reset voltage in response to the output of the comparator. Such a transfer device includes a first transistor that is turned on for outputting the first reset voltage when the first reset voltage is the selected reset voltage, and includes a second transistor that is turned on for outputting the second reset voltage when the second reset voltage is the selected reset voltage.

In a further embodiment of the present invention, the reset voltage selector selects a higher one of the first and second reset voltages as the selected reset voltage.

In another embodiment of the present invention, each of a plurality of active pixels generates a respective first reset voltage for a corresponding column of the image sensor. In addition, each of a plurality of optical black pixels generates a respective second reset voltage for a corresponding column of the image sensor. Furthermore, each of a plurality of reset voltage selectors selects one of the first and second respective reset voltages for a corresponding column as a respective selected reset voltage.

In a further embodiment of the present invention, the reset voltage selector includes an offset generator for generating an offset that is added to the first reset voltage to generate an adjusted first reset voltage. In that case, the reset voltage selector selects one of the adjusted first reset voltage and the second reset voltage as the selected reset voltage.

The present invention may be used to particular advantage when the selected reset voltage is used for CDS (correlated double sampling) within the image sensor that is a CMOS image sensor.

In this manner, the reset voltage is clamped separately for each column of the array of pixels in the image sensor for more accurately accounting for fabrication variations along such columns. In addition, a fixed clamping voltage is not used across the whole array of pixels for more flexibly clamping the reset voltage across the array of pixels.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, and 4 refer to elements having similar structure and/or function.

DETAILED DESCRIPTION OF THE INVENTION

Figure 1:
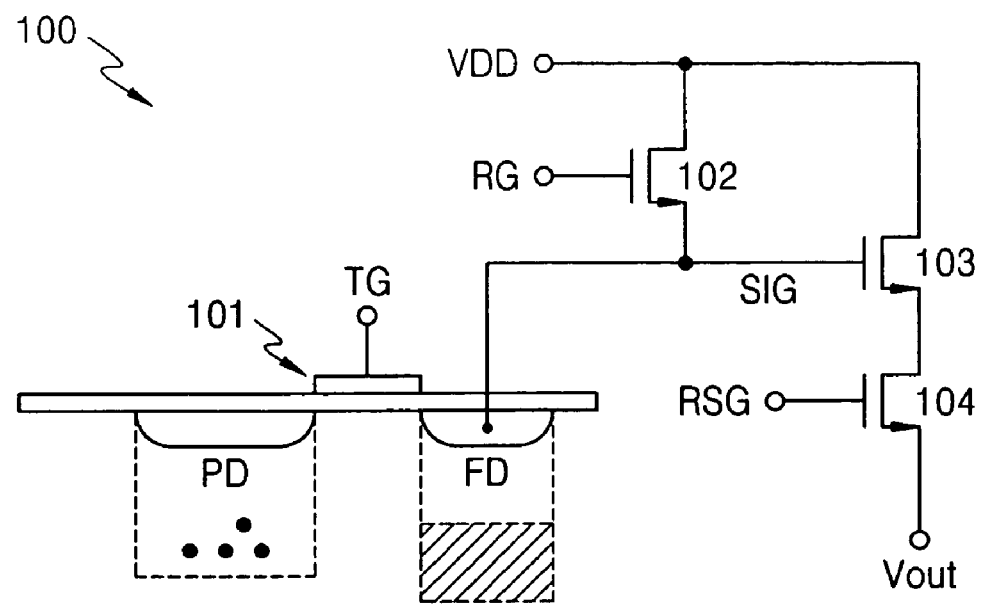
FIG. 1 is a schematic diagram of a unit pixel of a conventional CMOS image sensor.
Figure 2:
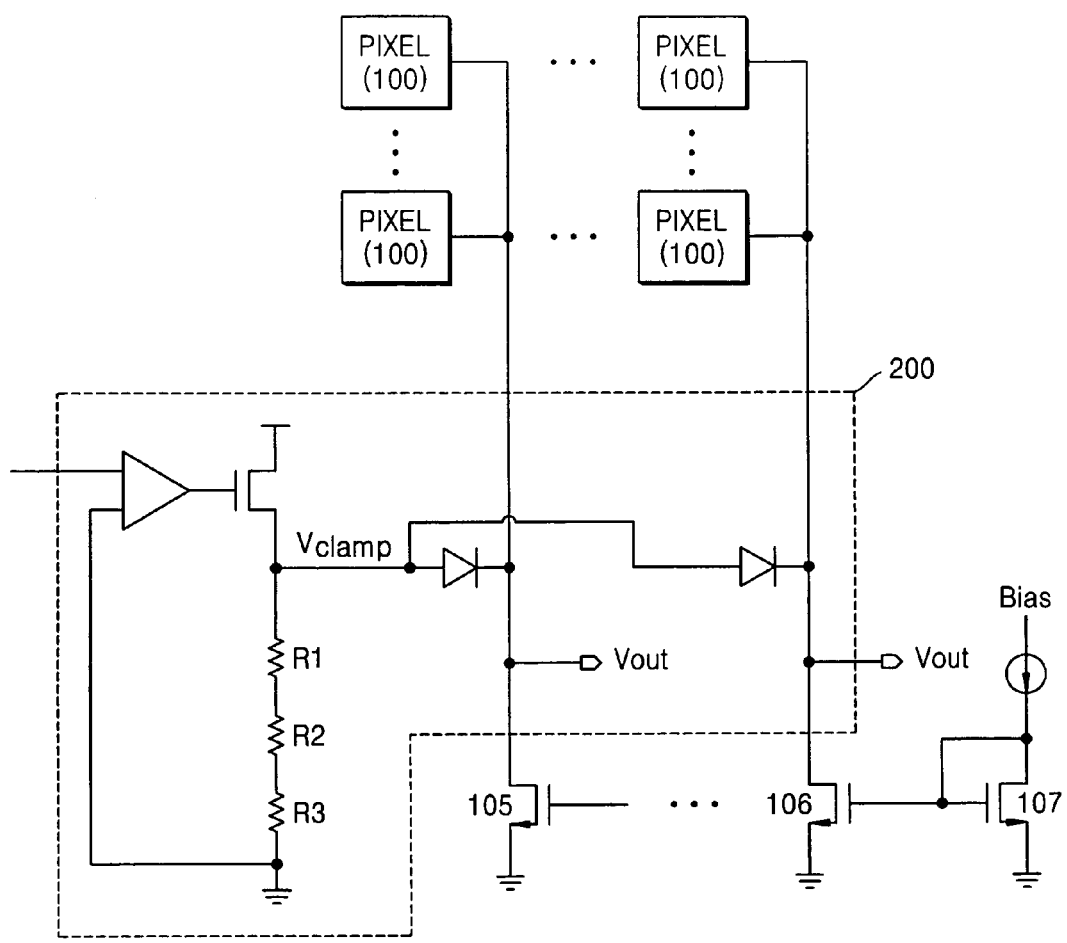
FIG. 2 is a schematic diagram of a clamp circuit connected to the conventional CMOS image sensor, in the prior art.
Figure 3:
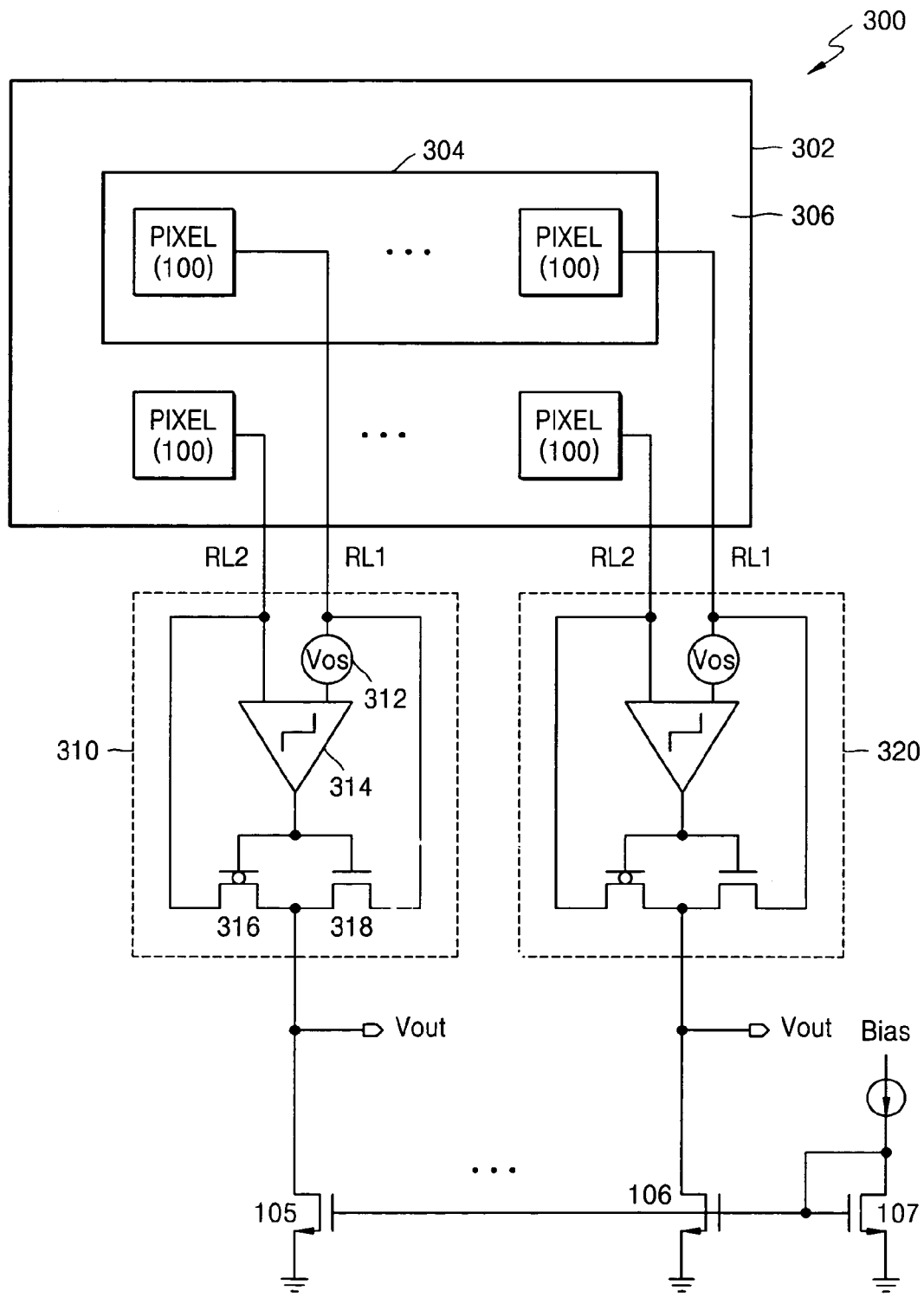
FIG. 3 is a schematic diagram of a CMOS image sensor including elements for clamping a reset voltage, according to an embodiment of the present invention.

FIG. 3 shows a schematic diagram of an apparatus for clamping a reset voltage within a CMOS image sensor according to an embodiment of the present invention. Referring to FIG. 3, a CMOS image sensor 300 includes an array 302 of pixels 100 arranged in rows and columns. The array 302 includes an active region 304 that is a portion of the array 302 and includes an optical black (OB) region 306 surrounding the active region 304.

A pixel 100 located within the active region 304 is hereafter referred to as an active pixel, and a pixel 100 located within the OB region 306 is hereafter referred to as an optical black pixel. The active pixels within the active region 304 are exposed to light, whereas the optical black pixels within the OB region 306 are shielded from light.

Each column of the array 302 has a respective active pixel in the active region 304 and a respective optical black pixel in the OB region 306. The respective active pixel generates a respective first reset voltage RL1 for a column, and the respective optical black pixel generates a respective second reset voltage RL2 for the column.

In addition, a respective reset voltage selector is coupled to the respective active pixel and the respective optical black pixel for each column. For example, FIG. 3 shows a first reset voltage selector 310 for a first column of the array 302, and a second reset voltage selector 320 for a second column of the array 302.

Each reset voltage selector such as the first reset voltage selector 310 includes an offset generator 312 for generating an offset voltage that is added to the first reset voltage RL1 to generate an adjusted first reset voltage that is input to a comparator 314. The present invention may be practiced with or without the offset generator 312. If an offset generator 312 is not included, the first reset voltage RL1 is directly coupled to the comparator 314. In addition, the second reset voltage RL2 is also input to the comparator 314.

Furthermore, the reset voltage selector 310 includes a transfer device comprised of a PMOSFET (P-channel metal oxide semiconductor field effect transistor) 316 and an NMOSFET (N-channel metal oxide semiconductor field effect transistor) 318. The output of the comparator 314 is coupled to the gates of the PMOSFET 316 and the NMOSFET 318.

Additionally, the second reset voltage RL2 is applied on a source of the PMOSFET 316, and the first reset voltage RL1 is applied on a source of the NMOSFET 318. The drains of the PMOSFET 316 and the NMOSFET 318 are coupled to a load transistor 105 and generate an output voltage Vout thereon that is a selected one of the first and second reset voltages RL1 or RL2. Each reset voltage selector for each column of the array 302 is implemented similarly for receiving the respective first and second reset voltages RL1 and RL2 and generating a respective output voltage Vout at a corresponding load transistor.

Generally, the more light a pixel is exposed to in the array 302, the more a reset voltage is likely to vary. The second reset voltage RL2 generated by an optical black pixel is not exposed to light and thus has a relatively stable voltage level.

The operation of the example reset voltage selector 310 is now described. First assume the case when the offset generator 312 is not included within the reset voltage selector 310. In that case, when the first reset voltage RL1 is lower than the second reset voltage RL2, the output of the comparator 314 outputs a logic low level such that the PMOSFET 316 is turned on (while the NMOSFET 318 is turned off). Therefore, the second reset voltage RL2, which is higher than the first reset voltage RL1, is the selected reset voltage that is transferred to the load 105 as the output voltage Vout.

On the other hand, if the second reset voltage RL2 is lower than the first reset voltage RL1 (without the offset generator 312), the comparator 314 outputs a logic high level such that the NMOSFET 318 is turned on (while the PMOSFET 316 is turned off). Thus, the first reset voltage RL1, which is higher than the second reset voltage RL2, is the selected reset voltage that is transferred to the load 105 as the output voltage Vout.

Such a selected reset voltage that is the higher voltage between the first and second reset voltages RL1 or RL2 (without the offset generator 312) is used for the correlated doubling sampling process in the CMOS image sensor 300. In such a CDS process, a voltage difference between a data voltage and the selected reset voltage is a luminance signal that is converted into a digital signal within the CMOS image sensor 300.

Now assume that the offset generator 312 is included within the reset voltage selector 310 for generating an offset voltage Vos. The offset voltage Vos may be a positive or negative voltage to be summed with the first reset voltage RL1. In that case, an adjusted first reset voltage that is the sum of the first reset voltage RL1 and the offset voltage Vos is input to the comparator 314. Thus, the reset voltage selector 310 generates as the selected reset voltage the higher one of such an adjusted first reset voltage (RL1+Vos) and the second reset voltage RL2.

Figure 4:
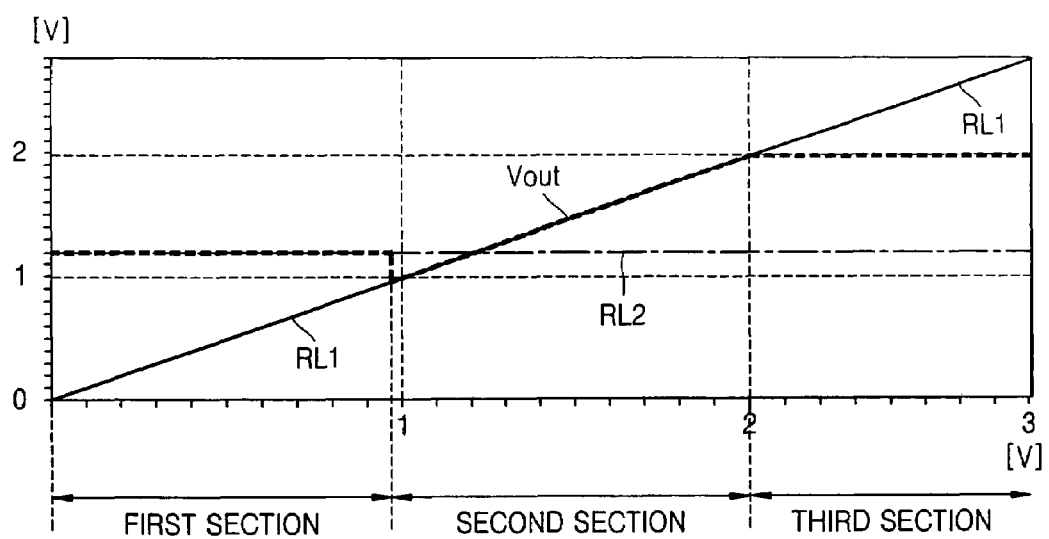
FIG. 4 is a graph from simulation of the CMOS image sensor of FIG. 3.

FIG. 4 shows a graph illustrating simulation results for the reset voltage selector 310 of FIG. 3. Referring to the example simulation of FIG. 4, the second reset voltage RL2 from an optical black pixel is relatively stable at a value of about 1.2V. In contrast, the first reset voltage RL1 which is from an active pixel exposed to light is varied from 0V to 3V.

Further referring to FIG. 4, the FIRST SECTION represents a region for a RESET mode of the CMOS sensor 300. In FIG. 4, the second reset voltage RL2 is higher than the adjusted first reset voltage (RL1+Vos) in the FIRST SECTION. For example, when the active pixel generating the first reset voltage RL1 is exposed to excessive light, the first reset voltage RL1 may undesirably decrease too much.

In that case, the second reset voltage RL2 is the selected reset voltage transferred as the output voltage Vout in the FIRST SECTION. Thus, the lower limit of the reset voltage transferred as the output voltage Vout is clamped to the second reset voltage RL2 during the RESET mode in the FIRST SECTION.

Additionally referring to FIG. 4, the SECOND SECTION represents a region for a normal read operation where the adjusted first reset voltage (RL1+Vos, with Vos being 0.22 Volts for example) is higher than the second reset voltage RL2. Thus, the adjusted first reset voltage (RL1+Vos) is the selected reset voltage transferred as the output voltage Vout in the SECOND SECTION of the example of FIG. 4. In the SECOND SECTION, the adjusted first reset voltage (RL1+Vos) is a video signal of a pixel 100 selected by row and column addressing (not shown). (Vout in the THIRD SECTION of FIG. 4 is fixed to 2 Volts for purposes of biasing the NMOSFET 318 during the simulation of FIG. 4.)

Each reset voltage selector for each column of the array 302 operates similarly for receiving the respective first and second reset voltages RL1 and RL2 and generating a respective output voltage Vout at the corresponding load transistor. In this manner, the reset voltage is clamped separately for each column of the array 302 for more accurately accounting for fabrication variations along such columns. In addition, a fixed clamping voltage is not used across the whole array of pixels for more flexibly clamping the reset voltage across the array of pixels. Furthermore, adjusting the first reset voltage RL1 with the offset voltage Vos allows for more flexibility in clamping the reset voltage.

While the present invention has been particularly shown and described with reference to exemplary embodiments thereof, it will be understood by those of ordinary skill in the art that various changes in form and details may be made therein without departing from the spirit and scope of the present invention as defined by the following claims.

Thus, the foregoing is by way of example only and is not intended to be limiting. For example, any numbers of elements or circuit topology illustrated and described herein are by way of example only. In addition, the present invention has been described for a CMOS image sensor. However, the present invention may also be used for any other type of image sensors. The present invention is limited only as defined in the following claims and equivalents thereof.

What is claimed is:

1. An apparatus for clamping a reset voltage within an image sensor, the apparatus comprising:
   an active pixel for generating a first reset voltage;
   an optical black pixel for generating a second reset voltage; and
   a reset voltage selector for selecting one of the first and second reset voltages as a selected reset voltage, wherein the reset voltage selector includes:
   a comparator for comparing the first reset voltage and the second reset voltage; and
   a transfer device for outputting the selected reset voltage in response to the output of the comparator.

2. The apparatus of claim 1, wherein the transfer device includes:
   a first transistor that is turned on for outputting the first reset voltage when the first reset voltage is the selected reset voltage; and
   a second transistor that is turned on for outputting the second reset voltage when the second reset voltage is the selected reset voltage.

3. The apparatus of claim 1, wherein the reset voltage selector selects a higher one of the first and second reset voltages as the selected reset voltage.

4. The apparatus of claim 1, further comprising:
   a plurality of active pixels, each active pixel generating a respective first reset voltage for a corresponding column of the image sensor;
   a plurality of optical black pixels, each generating a respective second reset voltage for a corresponding column of the image sensor; and
   a plurality of reset voltage selectors, each selecting one of the first and second respective reset voltages for a corresponding column as a respective selected reset voltage.

5. The apparatus of claim 4, wherein each reset voltage selector includes:
   a respective offset generator for generating a respective offset voltage that is added to the respective first reset voltage to generate a respective adjusted first reset voltage for the corresponding column, wherein each reset voltage selector selects one of the respective adjusted first reset voltage and the respective second reset voltage as the respective selected reset voltage for the corresponding column.

6. The apparatus of claim 1, wherein the image sensor is a CIS (CMOS image sensor).

7. The apparatus of claim 1, wherein the reset voltage selector includes:
   an offset generator for generating an offset voltage that is added to the first reset voltage to generate an adjusted first reset voltage, wherein the reset voltage selector selects one of the adjusted first reset voltage and the second reset voltage as the selected reset voltage.

8. The apparatus of claim 7, wherein the reset voltage selector selects a higher one of the adjusted first reset voltage and the second reset voltage as the selected reset voltage.

9. The apparatus of claim 1, wherein the selected reset voltage is used for CDS (correlated double sampling) within the image sensor.

10. A method for clamping a reset voltage within an image sensor, comprising:
    generating a first reset voltage at an active pixel;
    generating a second reset voltage at an optical black pixel;

selecting one of the first and second reset voltages as a selected reset voltage;

comparing the first reset voltage and the second reset voltage; and outputting the selected reset voltage in response to the comparison of the first and second reset voltages.

11. The method of claim 10, further comprising:

turning on a first transistor for outputting the first reset voltage when the first reset voltage is the selected reset voltage; and turning on a second transistor for outputting the second reset voltage when the second reset voltage is the selected reset voltage.

12. The method of claim 10, further comprising:

selecting a higher one of the first and second reset voltages as the selected reset voltage.

13. The method of claim 10, further comprising:

generating a respective first reset voltage from a respective active pixel for each of a plurality of columns of the image sensor;

generating a respective second reset voltage from a respective optical black pixel for each of the columns; and selecting one of the first and second respective reset voltages as a respective selected reset voltage for the each of the columns.

14. The method of claim 13, further comprising:

generating a respective offset voltage that is added to the respective first reset voltage to generate a respective adjusted first reset voltage for each of the columns; and selecting one of the respective adjusted first reset voltage and the respective second reset voltage as the respective selected reset voltage for each of the columns.

15. The method of claim 10, wherein the image sensor is a CIS (CMOS image sensor).

16. The method of claim 10, further comprising:

generating an offset voltage that is added to the first reset voltage to generate an adjusted first reset voltage; and selecting one of the adjusted first reset voltage and the second reset voltage as the selected reset voltage.

17. The method of claim 16, further comprising:

selecting a higher one of the adjusted first reset voltage and the second reset voltage as the selected reset voltage.

18. The method of claim 10, wherein the selected reset voltage is used for CDS (correlated double sampling) within the image sensor.

* * * * *